United States Patent Office 3,326,900
Patented June 20, 1967

3,326,900
NOVEL 5,6-DIHYDRO-11H-PYRIDO[2,3-b][1,5] BENZODIAZEPINES
Günther Schmidt, Biberach an der Riss, Germany, assignor to Boehringer Ingelheim G.m.b.H., Ingelheim am Rhine, Germany, a corporation of Germany
No Drawing. Filed Feb. 23, 1965, Ser. No. 434,666
Claims priority, application Germany, Feb. 28, 1964, T 25,723
7 Claims. (Cl. 260—239.3)

This invention relates to novel 5,6-dihydro-11H-pyrido-[2,3-b][1,5]benzodiazepines and acid addition salts thereof, as well as to various methods of preparing these compounds.

More particularly, the present invention relates to 5,6-dihydro-11H-pyrido[2,3-b][1,5]benzodiazepines of the

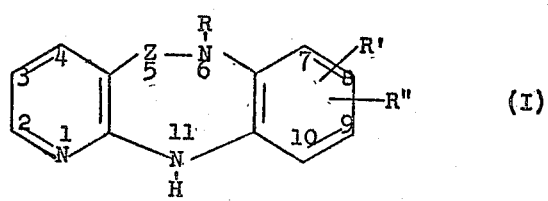

wherein
R is lower alkenyl; cycloalkyl; aralkyl whose aromatic moiety may have one or more halogen, lower alkyl or lower alkoxy substituents attached thereto; or —A—B where A is straight or branched lower alkylene and B is hydrogen, halogen, hydroxyl, lower alkoxy, lower alkylthio or

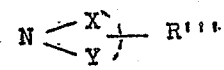

where X and Y are lower alkyl or, together with each other and the nitrogen atom to which they are attached, form a basic saturated heterocyclic ring, and R''' is hydrogen or lower alkyl;
R' and R'', which may be identical to or different from each other, are hydrogen, halogen, lower alkyl, lower alkoxy, trifluoromethyl, carboxyl or carbalkoxy, and
Z is carbonyl or methylene, and their non-toxic, pharmacologically acceptable acid addition salts.

The compounds according to the present invention may be prepared by various methods, among which the following have proved to be most convenient and efficient:

Method A

By converting a 5-oxo-5,6-dihydro-11H-pyrido[2,3-b][1,5]benzodiazepine of the formula

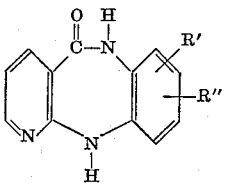

wherein R' and R'' have the same meanings as in Formula I, into the corresponding 6-alkali metal compound, reacting the alkali metal compound with a compound of the formula

RX     (III)

wherein R has the same meanings as in Formula I and X is the radical of a reactive ester, such as a halogen atom or the radical of a sulfuric acid ester or an aromatic sulfonic acid ester, to form a 5-oxo-5,6-dihydro-11H-pyrido[2,3-b][1,5]benzodiazepine of the formula

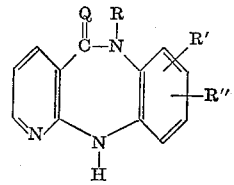

wherein R, R' and R'' have the same meanings as in Formula I, and subsequently reducing compound IV to obtain a compound of the Formula I wherein Z is methylene.

The conversion of compound II into the corresponding alkali metal compound may be effected by reacting compound II with an alkali metal hydroxide, an alkali metal alcoholate, an alkali metal amide or an alkali metal hydride. The reaction is preferably carried out at elevated temperatures and in the presence of an inert organic solvent; if an alkali metal hydroxide is used, an aqueous organic solvent may also be employed.

For conversion of the alkali metal-substituted 5-oxo-5,6-dihydro-11H-pyrido[2,3-b][1,5]benzodiazepine thus obtained into compound IV, the solution or suspension of the alkali metal compound is reacted directly, i.e., without isolation of the reaction product, with compound III at elevated temperatures, preferably at the boiling point of the solvent or suspension medium or at the boiling point of compound III, whichever is lower. The substitution surprisingly takes place exclusively on the nitrogen atom in the 6-position of the pyridobenzodiazepine. The substitution product IV may, if desired, be purified through an acid addition salt thereof, which may be formed by conventional methods.

The reduction of compound IV is effected preferably with the aid of lithium aluminum hydride in an inert anhydrous solvent at moderately elevated temperatures, advantageously at the boiling point of the particular solvent used. Examples of anhydrous solvents suitable for this purpose are ether, tetrahydrofuran and dioxane. In the event that compound IV is poorly soluble in the anhydrous solvent, it may be gradually extracted into the reaction vessel from a conventional extraction apparatus.

The reduction of compound IV may, however, also be carried out by other conventional methods, for instance, with hydrogen in the presence of a hydrogenation catalyst, preferably in the presence of a copper-chromium oxide catalyst in an inert organic solvent, such as dioxane, at temperatures between 100 and 250° C. and at a pressure between 100 and 250 atmospheres gauge. The reduction may further be effected by means of an alkali metal in an absolute lower alkanol pursuant to Bonveault-Blanc, Compt. rend., 136, 1676 (1903)

Method B

By reducing a compound of the Formula II to form 5,6-dihydro-11H-pyrido[2,3-b][1,5]benzodiazepine of the formula

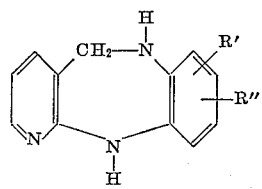

wherein R' and R'' have the same meanings as in Formula I, and reacting compound V with a compound of the Formula III. This method yields compounds of the Formula I wherein Z is methylene.

The reduction of compound II may be accomplished by any of the methods described for the reduction of compound IV in Method A; that is, preferably with lithium aluminum hydride in an inert anhydrous solvent at moderately elevated temperatures, or also by catalytic hydrogenation or by reduction with an alkali metal in an absolute lower alkanol. The reduction product V may, if desired, be purified through an acid addition salt thereof, which may itself be prepared by conventional methods.

The reaction of compound V with compound III is preferably carried out in the presence of an organic solvent at elevated temperatures, preferably at the boiling point of the solvent. Examples of suitable organic solvents are aliphatic alcohols and aromatic hydrocarbons; however, a stoichiometric excess of compound III may also be used as a solvent medium.

If desired, an inorganic base may be added to the reaction mixture of compounds V and III as an acid-binding agent, that is, as an agent capable of binding or neutralizing the acid HX released by the reaction, where X has the same meanings as in Formula III, in which case the reaction product is a pyridobenzodiazepine of the Formula I in which Z is methylene in the free base form. Normally, however, the reaction is performed without an acid-binding agent, whereby the acid HX released by the reaction immediately combines with the basic pyridobenzodiazepine product to form an acid addition salt thereof. If desired, this acid addition salt may be converted into the free base form by conventional methods, for instance, by neutralizing the acid addition salt with an inorganic base.

The 5-oxo-5,6-dihydro-11H-pyrido[2,3-b][1,5] benzodiazepines of the Formula II which are used as starting materials in Methods A and B are described in my co-pending application Ser. No. 427,503 filed Jan. 22, 1965, entitled "5,6 - dihydro-5-oxo-11H-pyrido[2,3-b][1,5]benzodiazepine Derivatives and Process."

Compounds of the Formula I may, if desired, be converted into their non-toxic, pharmacologically acceptable acid addition salts by conventional methods; for example, by dissolving the free base compound I in a suitable solvent and acidifying the solution with one or more molar equivalents of the desired acid. Examples of inorganic and organic acids which will form non-toxic, pharmacologically acceptable addition salts with a compound of the Formula I are the following: Hydrochloric acid, hydrobromic acid, sulfuric acid, phosphoric acid, nitric acid, tartaric acid, citric acid, succinic acid, malic acid, methane-sulfonic acid, 8-chloro-theophylline and the like. Compounds of the Formula I wherein R is other than a basic substituent form acid addition salts with one molar equivalent of the acid, whereas those wherein R is a basic substituent form addition salts with more than one molar equivalent of the acid.

The following examples further illustrate the present invention and will enable others skilled in the art to understand it more completely. It should be understood, however, that the invention is not limited to the particular examples given below.

EXAMPLE 1

*Preparation of 5,6-dihydro-5-oxy-6-methyl - 11H-pyrido[2,3-b][1,5]benzodiazepine and 5,6-dihydro-6-methyl-pyrido[2,3-b][1,5]benzodiazepine by method A*

(a) 21.1 gm. (0.1 mol) of 5,6-dihydro-5-oxo-11H- pyrido[2,3-b][1,5]benzodiazepine were dissolved in a warmed mixture of 300 cc. ethanol and 20 cc. aqueous 30% sodium hydroxide, and the resulting solution was admixed with 46 gm. (0.4 mol) of methyliodide. Thereafter, the mixture was refluxed for four hours. The reaction mixture was then evaporated in vacuo, and the residue was washed with water and recrystallized from ethanol. The product had a melting point of 171° C. and was identified to be 5,6 - dihydro-5-oxo-6-methyl-11H-pyrido[2,3][1,5]benzodiazepine of the formula

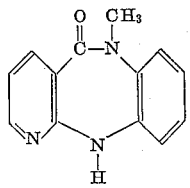

The yield was 65% theory.

*Analysis.*—$C_{13}H_{11}N_3O$; mol. wt. 225.2. Calculated: C, 69.28%; H, 4.92%; N, 18.65%. Found: C, 69.30%; H, 5.01%; N, 18.63%.

(b) 10 gm. of the product obtained in step (a) were dissolved in 50 cc. of absolute tetrahydrofuran, and the resulting solution was added dropwise to a suspension of 8 gm. of lithium aluminum hydride in 100 cc. of absolute tetrahydrofuran at room temperature, accompanied by stirring. The resulting mixture was refluxed for four hours while stirring, allowed to cool, and was then decomposed in customary fashion by adding aqueous tetrahydrofuran and then an aqueous potassium tartrate solution. The organic phase was separated and evaporated in vacuo. The oily residue was distilled in vacuo, and the fraction passing over between 153 and 155° C. at 0.05 mm. Hg was recrystallized from cyclohexane. The product had a melting point of 91–93° C. and was identified to be 5,6-dihydro-6-methyl-11H - pyrido[2,3-b][1,5]benzodiazepine of the formula

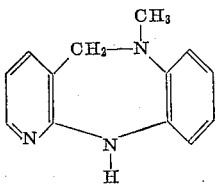

The yield was about 50% of theory.

*Analysis.*—$C_{13}H_{13}N_3$; mol. wt. 211.3. Calculated: C, 73.91%; H, 6.20%; N, 19.89%. Found: C, 74.00%; H, 6.47%; N, 20.05%.

EXAMPLE 2

*Preparation of 5,6 - dihydro-5-oxo-6-ethyl - 11H - pyrido [2,3-b][1,5]benzodiazepine and 5,6 - dihydro-6-ethyl-11H-pyrido[2,3-b][1,5]benzodiazepine by method A*

(a) 10.0 gm. (0.0475 mol) of 5,6-dihydro-5-oxo-11H-pyrido[2,3-b][1,5]benzodiazepine were dissolved in a mixture consisting of 40 cc. of a potassium tert. butylate solution (from 2.14 gm. of potassium and 40 cc. of tert. butanol) and 100 cc. of absolute dioxane, and the resulting solution was refluxed for two hours. Thereafter, 15.6 gm. (0.1 mol) of ethyliodide were added and the mixture was refluxed for four hours. The reaction mixture was then filtered to remove the precipitated potassium iodide, and the filtrate was evaporated in vacuo. The residue was recrystallized from ethanol, yielding a compound having a melting point of 148–151° C., which was identified to be 5,6-dihydro-5-oxo-6-ethyl-11H-pyrido[2,3-b] [1,5]benzodiazepine of the formula

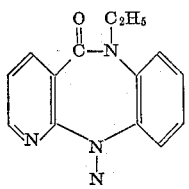

The yield was 85% of theory.

*Analysis.*—$C_{14}H_{13}N_3O$; mol. wt. 239.3. Calculated: C, 70.28%; H, 5.47%; N, 17.56%. Found: C, 70.30%; H, 5.43%; N, 17.60%.

(b) 5.8 gm. of the product of step (a) were reduced with 4.0 gm. of lithium aluminum hydride in 200 cc. of absolute tetrahydrofuran and the reaction mixture was worked up, as described in Example 1(b). The oily product had a boiling point of 135–139° C. at 0.05 mm. Hg. It was identified to be 5,6-dihydro-6-ethyl-11H-pyrido [3,2-b][1,5]benzodiazepine of the formula

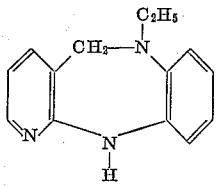

*Analysis.*—C₁₄H₁₅N₃; mol. wt. 225.3. Calculated: C, 74.64%; H, 6.71%; N, 18.65%. Found: C, 74.75%; H, 7.00%; N, 18.60%.

EXAMPLE 3

*Preparation of 5,6-dihydro - 5 - oxo-6-benzyl-11H-pyrido [2,3-b][1,5]benzodiazepine and 5,6-dihydro-6-benzyl-11H-pyrido[2,3-b][1,5]benzodiazepine by method A*

(a) 21.1 gm. (0.1 mol) of 5,6-dihydro-5-oxo-11H-pyrido[2,3-b][1,5]benzodiazepine were dissolved in 250 cc. of a warmed sodium butylate solution (2.5 gm. sodium in 250 cc. butanol). Thereafter, about half of the butanol was distilled off in vacuo and then about 250 cc. of 1,2,3,4-tetrahydronaphthalene were added, and the remaining butanol was distilled off. To the resulting suspension of 5,6-dihydro-5-oxo-6-sodium-11H-pyrido[2,3-b] [1,5]benzodiazepine in tetrahydronaphthalene 17.1 gm. (0.1 mol) of benzyl bromide were added, and the mixture was heated at about 200° C. for seven hours while stirring. Thereafter, the precipitated sodium bromide was filtered off, and the filtrate was evaporated in vacuo. The residue was distilled (B.P. 240–245° C. at 0.06 mm. Hg) and recrystallized from ethanol. The product had a melting point of 178–180° C. and was identified to be 5,6-dihydro - 5 - oxo - 6 - benzyl - 11H - pyrido[2,3-b][1,5] benzodiazepine of the formula

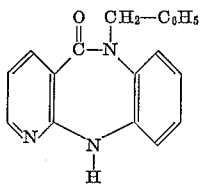

The yield was 74% of theory.

*Analysis.*—C₁₉H₁₅N₃O; mol. wt. 301.3. Calculated: C, 75.73%; H, 5.02%; N, 13.95%. Found: C, 75.60%; H, 5.06%; N, 13.94%.

(b) 10.6 gm. of the product of step (a) were reduced with 4 gm. of lithium aluminum hydride in absolute tetrahydrofuran and the reaction mixture was worked up, as described in Example 1(b). The raw product had a boiling point of 180–190° C. at 0.05 mm. Hg, and after recrystallization from cyclohexane had a melting point of 111–112° C. It was identified to be 5,6-dihydro-6-benzyl-11H-pyrido[2,3-b][1,5]benzodiazepine of the formula

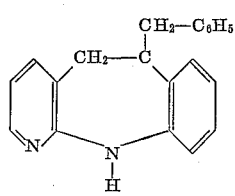

*Analysis.*—C₁₉H₁₇N₃; mol. wt. 287.4. Calculated: C, 79.41%; H, 5.96%; N, 14.63%. Found: C, 79.25%; H, 5.97%; N, 14.70%.

EXAMPLE 4

*Preparation of 5,6-dihydro - 5 - oxo-6,8-dimethyl-11H-pyrido[2,3-b][1,5]benzodiazepine and 5,6-dihydro-6,8-dimethyl - 11H - pyrido[2,3-b][1,5]benzodiazepine by method A*

(a) 22.5 gm. (0.1 mol) of a compound believed to be 5,6 - dihydro - 5 - oxo-8-methyl-11H-pyrido[2,3-b][1,5] benzodiazepine (the position of the methyl-substituent has not yet been established; it could also be in the 9-position) were reacted with 46 gm. of methyl iodide in a mixture consisting of 300 cc. ethanol and 20 cc. aqueous 30% sodium hydroxide, as described in Example 1(a). Recrystallized from ethanol, the product had a melting point of 208° C. It was believed to be the compound of the probable formula

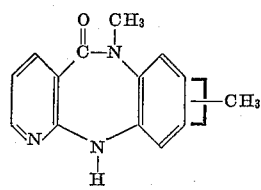

*Analysis.*—C₁₄H₁₃N₃O; mol. wt. 239.3. Calculated: C, 70.28%; H, 5.47%; N, 17.56%. Found: C, 70.40%; H, 5.53%; N, 17.57%.

(b) The product obtained in step (a) was reduced with lithium aluminum hydride and the reaction mixture was worked up, as described in Example 1(b). The raw reduction product had a boiling point of 155–160° C. at 0.05 mm. Hg; after recrystallization from isopropanol it had a melting point of 100° C. It was believed to be the compound of the probable formula

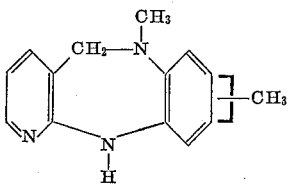

*Analysis.*—C₁₄H₁₅N₃; mol. wt. 225.3. Calculated: C, 74.64%; H, 6.71%; N, 18.65%. Found: C, 74.65%; H, 6.85%; N, 18.55%.

EXAMPLE 5

*Preparation of 5,6-dihydro-5-oxo-6 - (β - dimethylaminoethyl)-11H-pyrido[2,3-b][1,5]benzodiazepine, its hydrochloride and 5,6-dihydro-6-(β-dimethylaminoethyl)-11H-pyrido[2,3-b][1,5]benzodiazepine by method A*

0.2 mol of β-dimethylaminoethyl chloride was added to a suspension of 0.1 mol of the 6-sodium derivative of 5,6-dihydro-5-oxo-11H-pyrido[2,3-b][1,5]benzodiazepine in absolute xylene, which was prepared in a manner analogous to that described in Example 3(a) except that xylene was used instead of tetrahydronaphthalene. The resulting mixture was heated for four hours at about 115° C., accompanied by stirring. Thereafter, the reaction mixture was allowed to cool, was then filtered, and the filtrate was shaken with aqueous 10% hydrochloric acid. The acid aqueous phase was separated, made alkaline with sodium hydroxide and extracted with chloroform. The chloroform extract solution was dried over sodium sulfate, evaporated in vacuo, and the residue was distilled in vacuo. The fraction passing over between 185 and 187° C. at 0.06 mm. Hg was identified to be 5,6-dihydro- 5-oxo-6-(β - dimethylamino - ethyl) - 11H - pyrido[2,3-b]
[1,5]-benzodiazepine of the formula

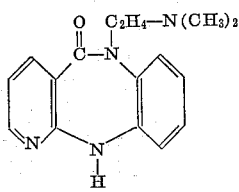

The yield was 58% of theory.

*Analysis.*—$C_{16}H_{18}N_4O$; mol. wt. 282.3. Calculated: C, 68.06%; H, 6.43%; N, 19.84%. Found: C, 68.00%; H, 6.54%; N, 20.00%.

A small sample of the product thus obtained was admixed with an equimolar amount of aqueous hydrochloric acid, the resulting solution was evaporated, and the residue was recrystallized from ethanol, yielding the hydrochloride of the free base product. It had a melting point of 240° C.

*Analysis.*—$C_{16}H_{19}ClN_4O$; mol. wt. 318.8. Calculated: C, 60.28%; H, 6.01%; Cl, 11.12%. Found: C, 60.20%; H, 6.07%; Cl, 10.90%.

(b) The free base product obtained in step (a) was reduced with lithium aluminum hydride and the reaction mixture was worked up, as described in Example 1(b). The reduction product had a boiling point of 160–165° C. at 0.08 mm. Hg. It was identified to be 5,6-dihydro-6-(β-dimethylamino-ethyl)-11H-pyrido[2,3-b][1,5 - benzodiazepine of the formula

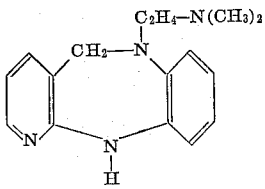

*Analysis.*—$C_{16}H_{20}N_4$; mol. wt. 268.4. Calculated: C, 71.61%; H, 7.51%; N, 20.88%. Found: C, 71.50%; H, 7.50%; N, 21.30%.

EXAMPLE 6

*Preparation of 5,6 - dihydro - 5-oxo-6-(β-dimethylamino-ethyl)-8(or 9) - chloro-11H-pyrido[2,3-b][1,5]-benzodiazepine and 5,6-dihydro-6-(β-dimethylamino-ethyl)-8(or 9) - chloro - 11H-pyrido[2,3-b][1,5]benzodiazepine my method A*

0.1 mol of the 6-sodium derivatives of 5,6-dihydro-5-oxo-8(or 9) - chloro-11H-pyrido[2,3-b][1,5]benzodiazepine (the exact point of attachment of the chlorine-substituent had not been established) was reacted with 0.2 mol of β-dimethylaminoethyl chloride in absolute xylene in a manner analogous to that described in Example 5(a). The raw product had a boiling point of 185–195° C. at 0.05 mm. Hg; recrystallized from petroleum ether, it had a melting point of 112° C. It was believed to be 5,6-dihydro-6-(β-dimethylaminoethyl)-8(or 9)-chloro-11H-pyrido [2,3-b][1,5]benzodiazepine.

*Analysis.*—$C_{16}H_{17}ClN_4O$; mol. wt. 316.8. Calculated: C, 60.66%; H, 5.41%; N, 17.69%. Found: C, 60.60%; H, 5.57%; N, 17.70%.

The product thus obtained was reduced with lithium aluminum hydride and the reaction mixture was worked up, as described in Example 1(b). The reduction product had a boiling point of 169–171° C. at 0.025 mm. Hg and was believed to be 5,6-dihydro-6(β-dimethylamino-ethyl)-8(or 9)-chloro-11H-pyrido[2,3-b][1,5]benzodiazephine.

EXAMPLE 7

*Preparation of 5,6 - dihydro-6-benzyl-11H-pyrido[2,3-b][1,5]benzodiazepine by method B*

(a) 5.0 gm. of 5,6-dihydro-5-oxo-11H-pyrido[2,3-b][1,5]benzodiazepine were gradually extracted over the course of four hours from a Thielepape extraction apparatus into a round-bottom flask containing a solution of 4.0 gm. of lithium aluminum hydride in 200 cc. of absolute dioxane. After completion of the extraction the reaction mixture was refluxed for one hour, allowed to cool and then decomposed in customary fashion by adding first aqueous dioxane and then an aqueous potassium tartrate solution. The organic phase was separated and evaporated in vacuo. The oily residue was distilled in vacuo. The major fraction passing over between 135 and 140° C. at 0.05 mm. Hg was recrystallized from carbon-tetrachloride, yielding a compound having a melting point of 125–126° C. It was identified to be 5,6-dihydro-11H-pyrido [2,3-b][1,5]benzodiazepine. The yield was 58% of theory.

*Analysis.*—$C_{12}H_{11}N_3$; mol. wt. 197.2. Calculated: C, 73.07%; H, 5.62%; N, 21.31%. Found: C, 73.00%; H, 5.78%; N, 21.43%.

(b) 0.02 mol of the end product of step (a) was refluxed for two hours with a solution of 0.1 mol of benzyl bromide in 50 cc. of absolute ethanol. The precipitate formed thereby, which was identified to be the hydrobromide of 5,6-dihydro-6-benzyl-11H-pyridol[2,3-b][1,5]benzodiazepine, was separated and dissolved in ethanolic sodium hydroxide. Water was added to the resulting solution, whereby a precipitate was formed which was separated, dried and recrystallized from cyclohexane. The product had a melting point of 111–112° C. It was identical with the end product of Example 3(b). The yield was 75% of theory.

EXAMPLE 8

*Preparation of 5,6-dihydro-5-oxo-6(γ-dimethylamino-n-propyl)-11H-pyrido[2,3-b][1,5]benzoiazepine and 5,6-dihydro-6-(γ-dimethylamino-n-propyl)-11H - pyrido[2,3-b][1,5]benzodiazepine by method A*

(a) 0.2 mol of γ-dimethylamino-n-propyl chloride was added to a suspension of 0.1 mol of the 6-sodium derivative of 5,6-dihydro-5-oxo-11H-pyrido[2,3-b][1.5]benzodiazepine (obtained pursuant to Example 3(a)), and the mixture was refluxed for four hours while stirring. Thereafter, the reaction mixture was filtered, the filtrate was evaporated in vacuo, and the oily residue was distilled. The fraction passing over between 180 and 200° C. at 0.05 mm. Hg crystallized upon cooling. Recrystallized from gasoline, it had a melting point of 101–102° C. It was identified to be 5,6-dihydro-5-oxo-6-(γ-dimethyl-amino-n-propyl)-11H-pyrido[2,3 - b][1,5]benzodiazepine of the formula

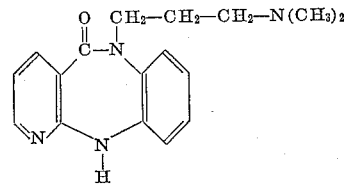

The yield was 63% of theory.

*Analysis.*—$C_{17}H_{20}N_4O$; mol. wt. 296.4. Calculated: C, 68.89%; H, 6.80%; N, 18.91%. Found: C, 69.01%; H, 6.94%; N, 19.06%.

Its hydrochloride had a melting point of 219–220° C. (recrystallized from ethanol).

*Analysis.*—$C_{17}H_{21}ClN_4O$; mol. wt. 332.8. Calculated: C, 61.34%; H, 6.36%; Cl, 10.65%; N, 16.84%. Found: C, 61.10%; H, 6.47%; Cl, 10.87%; N, 16.60%.

(b) The free base product obtained in step (a) was reduced with lithium aluminum hydride and the reaction mixture was worked up, as described in Example 1(b).

The reduction product had a melting point of 87–88° C. (recrystallized from cyclohexane). It was identified to be 5,6 - dihydro - 6 - (γ - dimethylamino - n - propyl) - 11H-pyrido[2,3-b][1,5]benzodiazepine of the formula

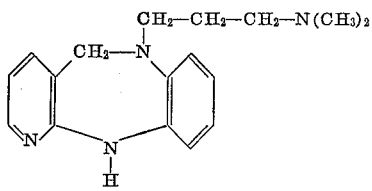

*Analysis.*—$C_{17}H_{22}N_4$; mol. wt. 282.4. Calculated: C, 72.31; H, 7.85%; N, 19.84%. Found: C, 72.30%; H, 7.72%; N, 19.83%.

EXAMPLE 9

*Preparation of 5,6-dihydro-5-oxo-6,8,9-trimethyl-11H-pyrido[2,3-b][1,5]benzodiazepine and 5,6-dihydro-6,8,9-trimethyl - 11H - pyrido[2,3-b][1,5]benzodiazepine by method A*

(a) Using a procedure analogous to that described in Example 1(a), 5,6-dihydro-5-oxo-6,8,9-trimethyl-11H-pyrido[2,3-b][1,5]benzodiazepine, M.P. 202–294° C. (recrystallized from ethanol), of the formula

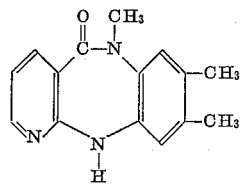

was prepared from 5,6-dihydro-5-oxo-8,9-dimethyl-11H-pyrido[2,3-b][1,5]benzodiazepine and methyliodide. The yield was 75% of theory.

*Analysis.*—$C_{15}H_{15}N_3O$; mol. wt. 253.3. Calculated: C, 71.13%; H, 5.97%; N, 16.59%. Found: C, 71.20%; H, 6.14%; N, 16.69%.

(b) The product obtained in step (a) was reduced with lithium aluminum hydride and the reaction mixture was worked up, as described in Example 1(b), yielding 5,6 - dihydro - 6,8,9 - trimethyl - 11H - pyrido[2,3-b][1,5]benzodiazepine, M.P. 152–154° C. (recrystallized from ethanol), of the formula

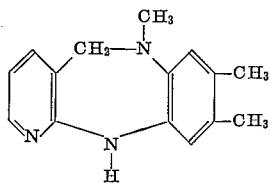

*Analysis.*—$C_{15}H_{17}N_3$; mol wt. 239.3. Calculated: C, 75.28%; H, 7.16%; N, 17.51%. Found: C, 75.60%; H, 7.21%; N, 17.60%.

EXAMPLE 10

*Preparation of 5,6 - dihydro - 5 - oxo-6-(β-dimethylamino-ethyl) - 8,9 - dimethyl - 11H - pyrido[2,3-b][1,5]benzodiazepine and 5,6-dihydro-6-(β-dimethylamino-ethyl) 8,9 - dimethyl-11H-pyrido[2,3 - b][1,5]benzodiazepine by method A*

Using a procedure analogous to that described in Example 8(a), 5,6-dihydro-5-oxo-6-(β-dimethylamino-ethyl) 8,9 - dimethyl - 11H - pyrido[2,3-b][1,5]benzodiazepine was prepared from 5,6-dihydro-5-oxo-8,9-dimethyl-11H-pyrido[2,3-b][1,5]benzodiazepine and β-dimethylamino-ethylchloride. The residue remaining after evaporation of the xylene solution was recrystallized from a mixture consisting of 1 part by volume of ethylacetate and 2 parts by volume of cyclohexane. The product had a melting point of 145–147° C., and the yield was 60% of theory.

*Analysis.*—$C_{18}H_{22}N_4O$; mol. wt. 310.4. Calculated C, 69.65%; H, 7.14%; N, 18.05%. Found: C, 69.45%; H, 7.17%; N, 18.03%.

(b) The product obtained in step (a) was reduced with lithium aluminum hydride and the reaction mixture was worked up, as described in Example 1(b). The reduction product had a boiling point of 171–174° C. at 0.07 mm. Hg. It was identified to be 5,6-dihydro-6-(β-dimethylamino - ethyl) - 8,9 - dimethyl - 11H - pyrido[2,3-b][1,5] benzodiazepine.

*Analysis.*—$C_{18}H_{24}N_4$; mol. wt. 296.4. Calculated: C, 72.93%; H, 8.16%; N, 18.91%. Found: C, 73.10%; H, 8.42%; N, 19.25%.

EXAMPLE 11

(a) Using a procedure analogous to that described in Example 2(a), 5,6-dihydro-5-oxo-6-ethyl-8,9-dimethyl-11H - pyrido[2,3 - b][1,5]benzodiazepine was prepared from 5,6-dihydro-5-oxo-8,9-dimethyl-11H-pyrido[2,3-b][1,5]benzodiazepine and ethyliodide. The product had a melting point of 162–163° C. (recrystallized from ethanol).

*Analysis.*—$C_{16}H_{17}N_3O$; mol. wt. 267.3. Calculated: C, 71.89%; H, 6.41%; N, 15.72%. Found: C, 71.60% H, 6.56%; N, 15.58%.

(b) The product obtained in step (a) was reduced with lithium aluminum hydride and the reaction mixture was worked up, as described in Example 1(b). The reduction product had a boiling point of 145–147° C. at 0.03 Hg. It was identified to be 5,6-dihydro-6-ethyl-8,9-dimethyl-11H-pyrido[2,3-b][1,5]benzodiazepine.

*Analysis.*—$C_{16}H_{19}N_3$; mol. wt. 253.3. Calculated: C, 75.85%; H, 7.56%; N, 16.59%. Found: C, 75.60%; H, 7.65%; N, 16.86%.

EXAMPLE 12

(a) Using a procedure analogous to that described in Example 2(a), 5,6-dihydro-5-oxo-6-ethyl-8(or 9)-chloro-11H - pyrido[2,3 - b][1,5]benzodiazepine was prepared from 5,6-dihydro-5-oxo-8(or 9)-chloro-11H-pyrido[2,3-b][1,5]benzodiazepine and ethyliodide. Recrystallized from isopropanol, the product had a melting point of 179–181° C.

*Analysis.*—$C_{14}H_{12}ClN_3O$; mol. wt. 273.7. Calculated: C, 61.43%; H, 4.42%; N, 15.35%. Found: C, 61.45%; H, 4.25%; N, 15.25%.

(b) The product obtained in step (a) was reduced with lithium aluminum hydride and the reaction mixture was worked up, as described in Example 1(b). The reduction product had a melting point of 125–127° C. (recrystallized from ethanol). It was believed to be 5,6-dihydro-6-ethyl-8(or 9)-chloro-11H-pyrido[2,3-b][1,5]benzodiazepine.

*Analysis.*—$C_{14}H_{14}ClN_3$; mol. wt. 259.7. Calculated: C, 64.74%; H, 5.43%; N, 16.18%; Cl, 13.65%. Found: C, 64.80%; H, 5.50%; N, 16.18%; Cl. 13.40%.

EXAMPLE 13

(a) Using a procedure analogous to that described in Example 5(a), 5,6-dihydro-5-oxo-6-(β-dimethylamino-ethyl - 8(or 9) - methyl - 11H - pyrido[2,3 - b][1,5] benzodiazepine was prepared from 5,6-dihydro-5-oxo-8 (or 9)-methyl-11H-pyrido[2,3-b][1,5]benzodiazepine and β-dimethylamino-ethyl chloride. Recrystallized from gasoline, the product had a melting point of 105° C.

*Analysis.*—$C_{17}H_{20}N_4O$; mol. wt. 296.4. Calculated: C, 68.89%; H, 6.80%; N, 18.91%. Found: C, 69.00%; H, 6.91%; N, 19.04%.

(b) The product obtained in step (a) was reduced with lithium aluminum hydride and the reaction mixture was worked up, as described in Example 1(b). The reduction product had a boiling point of 157–159° C. at 0.02 mm. Hg. It was believed to be 5,6-dihydro-6-(β-dimethylamino-ethyl)-8 (or 9) - methyl - 11H - pyrido[2,3-b][1,5]benzodiazepine.

*Analysis.*—$C_{18}H_{24}N_4$: mol. wt. 296.4. Calculated: C, 72.93%; H, 8.16%; N, 18.91%. Found: C, 72.90%; H, 8.29%; N, 19.19%.

EXAMPLE 14

(a) Using a procedure analogous to that described in Example 5(a), 5,6-dihydro-5-oxo-6-(β-morpholino-ethyl)-11H-pyrido[2,3-b][1,5]benzodiazepine, M.P. 161–162° C. (recrystallized from isopropanol), of the formula

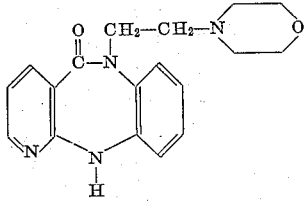

was prepared from 5,6-dihydro-5-oxo-11H-pyrido[2,3-b][1,5]benzodiazepine and β-morpholinoethyl chloride.

*Analysis.*—$C_{18}H_{20}N_4O_2$; mol. wt. 324.4. Calculated: C, 66.65%; H, 6.22%; N, 17.27%. Found: C, 66.85%; H, 6.36%; N, 17.12%.

(b) The product obtained in step (a) was reduced with lithium aluminum hydride and the reaction mixture was worked up, as described in Example 1(b). The reduction product had a boiling point of 187–189° C. at 0.04 mm. Hg and was identified to be 5,6-dihydro-6-(β-morpholino-ethyl) - 11H - pyrido[2,3 - b][1,5]benzodiazepine of the formula

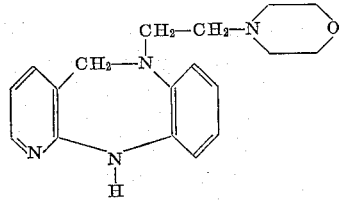

*Analysis.*—$C_{18}H_{22}N_4O$; mol. wt. 310.4. Calculated: C, 69.65%; H, 6.98%; N, 18.05%. Found: C, 69.75%; H, 7.33%; N, 18.36%.

EXAMPLE 15

(a) Using a procedure analogous to that described in Example 5(a), 5,6 - dihydro - 5 - oxo - 6 - (β - morpholino - ethyl) - 8,9 - dimethyl - 11H - pyrido[2,3 - b][1,5]benzodiazepine, M.P. 149–150° C. (recrystallized from ethanol), was prepared from 5,6-dihydro-5-oxo-8,9-dimethyl-11H-pyrido[2,3-b][1,5]benzodiazepine and β-morpholinoethyl chloride.

*Analysis.*— $C_{20}H_{24}N_4O_2$; mol. wt. 352.4. Calculated: C, 68.16%; H, 6.86%; N, 15.90%. Found: C, 68.35%; H, 7.09%; N, 15.90%.

(b) The product obtained in step (a) was reduced with lithium aluminum hydride and the reaction mixture was worked up, as described in Example 1(b). The reduction product had a boiling point of 193–196° C. at 0.02 mm. Hg and was identified to be 5,6-dihydro-6-(β-morpholino-ethyl) - 8,9-dimethyl-11H-pyrido[2,3-b][1,5]benzodiazepine.

*Analysis.*—$C_{20}H_{26}O_4$; mol. wt. 338.5. Calculated: C, 70.97%; H, 7.74%; N, 16.55%. Found: C, 70.65%; H, 7.86%; N, 16.70%.

EXAMPLE 16

Using a procedure analogous to that described in Example 2 (a), 5,6-dihydro-5-oxo-6-isobutyl-11H-pyrido[2,3-b][1,5]benzodiazepine, M.P. 125–127° C. (recrystallized from cyclohexane), of the formula

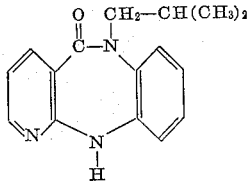

was prepared from 5,6-dihydro-5-oxo-11H-pyrido[2,3-b][1,5]benzodiazepine and isobutyliodide.

*Analysis.*—$C_{16}H_{17}N_3O$; mol. wt. 267.3. Calculated: C, 71.91%; H, 6.41%; N, 15.72%. Found: C, 71.90%; H, 6.41%; N, 15.90%.

EXAMPLE 17

Using a procedure analogous to that described in ample 2(a), 5,6-dihydro-5-oxo-6-allyl-11H-pyrido[2,3-b][1,5]benzodiazepine, M.P. 105–107° C. (recrystallized from ethanol), of the formula

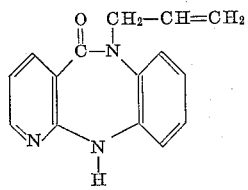

was prepared from 5,6-dihydro-5-ozo-11H-pyrido[2,3-b][1,5]benzodiazepine and allylbromide.

*Analysis.*—$C_{15}H_{17}N_3O$; mol. wt. 251.3. Calculated: C, 71.69%; H, 5.21%; N, 16.73%. Found: C, 71.80%; H, 5.50%; N, 16.82%.

EXAMPLE 18

Using a procedure analogous to that described in Example 2(a), 5,6-dihydro-5-oxo-6-(β-methoxy ethyl)-11H - pyrido[2,3 - b][1,5]benzodiazepine, M.P. 125–126° C. (recrystallized from a mixture of ethanol and water), of the formula

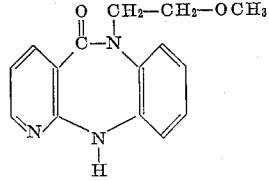

was prepared from 5,6-dihydro-5-oxo-11H-pyrido[2,3-b][1,5]benzodiazepine and β-methoxyethyl chloride.

*Analysis.*—$C_{15}H_{15}N_3O_2$; mol. wt. 269.3. Calculated: C, 66.90%; H, 5.61%; N, 15.61%. Found: C, 67.20%; H, 5.85%; N, 15.85%.

EXAMPLE 19

Using a procedure analogous to that described in Example 2(a), 5,6-dihydro-5-oxo-6-(γ-chloro-n-propyl-11H-pyrido[2,3-b][1,5]benzodiazepine, M.P. 128–130° C. (recrystallized from ethanol), of the formula

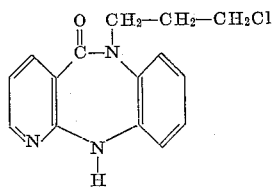

was prepared from 5,6-dihydro-5-oxo-11H-pyrido[2,3-b][1,5]benzodiazepine and γ-chloro-n-propyl iodide.

*Analysis.*—$C_{15}H_{14}ClN_3O$; mol. wt 287.7. Calculated: C, 62.61%; H, 4.90%; N, 14.61%; Cl, 12.32%. Found: C, 62.90%; H, 5.05%; N, 14.60%; Cl, 12.00%.

EXAMPLE 20

Using a procedure analogous to that described in Example 2(a), 5,6-dihydro-5-oxo-6-(p-chloro-benzyl)-11H- pyrido[2,3-b][1,5]benzodiazepine, M.P. 205–207° C. (recrystallized from ethanol), of the formula

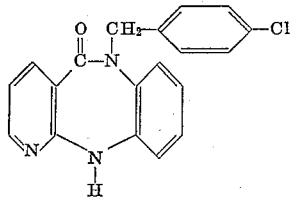

was prepared from 5,6-dihydro-5-oxo-11H-pyrido[2,3-b][1,5]benzodiazepine and p-chlorobenzyl chloride.

Analysis.—$C_{19}H_{14}ClN_3O$; mol. wt. 335.8. Calculated: C, 67.96%; H, 4.20%; N, 12.52%; Cl, 10.56%. Found: C, 67.80%; H, 4.28%; N, 12.37%; Cl, 10.77%.

EXAMPLE 21

Using a procedure analogous to that described in Example 2(a) 5,6-dihydro-5-oxo-6-(γ-[N'-methyl-piperazino]-n-propyl) - 11H-pyrido[2,3-b][1,5]benzodiazepine, M.P. 132–133° C. (recrystallized from cyclohexane), of the formula

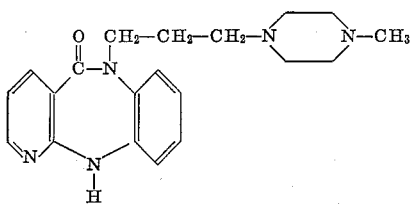

was prepared from 5,6-dihydro-5-oxo-11H-pyrido[2,3-b][1,5]benzodiazepine and γ-(N'-methyl-piperazino)-n-propyl chloride.

Analysis.—$C_{20}H_{25}N_5O$; mol. wt. 351.5. Calculated: C, 68.34%; H, 7.17%; N, 19.92%. Found: C, 68.55%; H, 7.25%; N, 20.05%.

EXAMPLE 22

Using a procedure analogous to that described in Example 2(a), the compound believed to be 5,6-dihydro-5-oxo-6-(γ-dimethylamino-n-propyl)-8(or 9)-chloro-11H-pyrido[2,3-b][1,5]benzodiazepine, B.P.$_{0.13}$ 212° C., was prepared from 5,6-dihydro-5-oxo-8(or 9)-chloro-11H-pyrido[2,3-b][1,5]benzodiazepine and γ-dimethylamino-n-propyl chloride.

Analysis.—$C_{17}H_{19}ClN_4O$; mol. wt. 330.8. Calculated: C, 61.72%; H, 5.79%; N, 16.93%. Found: C, 61.40%; H, 5.87%; N, 16.82%.

EXAMPLE 23

Using a procedure analogous to that described in Example 2(a), the compound believed to be 5,6-dihydro-5-oxo-6-(γ-[N'-methyl-piperazino]-n-propyl)-8(or 9)-chloro-11H - pyrido[2,3-b][1,5]benzodiazepine, M.P. 164–166° C. (recrystallized from ethylacetate), was prepared from 5,6-dihydro-5-oxo-8(or 9)-chloro-11H-pyrido[2,3-b][1,5]benzodiazepine and γ-(N'-methyl-piperazino)-n-propyl chloride.

Analysis.—$C_{20}H_{24}ClN_5O$; mol. wt. 385.9. Calculated: C, 62.25%; H, 6.27%; N, 18.15%; Cl, 9.19%. Found: C, 62.00%; H, 6.30%; N, 18.45%; Cl, 9.38%.

EXAMPLE 24

Using a procedure analogous to that described in Example 2(a), 5,6 - dihydro-5-oxo-6-(γ-dimethylamino-n-propyl)-8,9-dimethyl - 11H - pyrido[2,3-b][1,5]benzodiazepine, M.P. 143–145° C. (recrystallized from cyclohexane), was prepared from 5,6-dihydro-5-oxo-8,9-dimethyl - 11H-pyrido[2,3-b][1,5]benzodiazepine and γ-dimethylamino-n-propyl chloride.

Analysis.—$C_{19}C_{24}N_4O$; mol. wt. 324.4. Calculated: C, 70.34%; H, 7.46%; N, 17.27%. Found: C, 70.20%; H, 7.48%; N, 17.38%.

EXAMPLE 25

Using a procedure analogous to that described in Example 2(a), 5,6-dihydro-5-oxo-6-(β-piperidino-ethyl)-8,9-dimethyl - 11H - pyrido[2,3-b][1,5]benzodiazepine, M.P. 147–148° C. (recrystallized from cyclohexane), of the formula

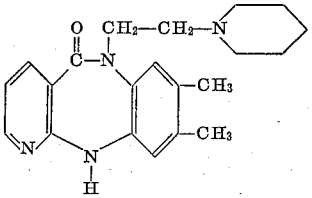

was prepared from 5,6-dihydro-5-oxo-8,9-dimethyl-11H-pyrido[2,3-b][1,5]benzodiazepine and β-piperidino-ethyl chloride.

Analysis.—$C_{21}H_{26}N_4O$; mol. wt. 350.5. Calculated: C, 71.97%; H, 7.48%; N, 15.98%. Found: C, 71.90%; H, 7.54%; N, 15.50%.

EXAMPLE 26

Using a procedure analogous to that described in Example 2(a), 5,6 - dihydro-5-oxo-6-(γ-[N'-methylpiperazino]-n-propyl) - 8,9 - dimethyl-11H-pyrido[2,3-b][1,5]benzodiazepine, M.P. 129–131° C. (recrystallized from cyclohexane), was prepared from 5,6-dihydro-5-oxo-8,9-dimethyl-11H-pyrido[2,3-b][1,5]benzodiazepine and γ-(N'-methylpiperazino)-n-propyl chloride.

Analysis.—$C_{22}H_{29}N_5O$; mol. wt. 379.5. Calculated: C, 69.62%; H, 7.70%; N, 18.46%. Found: C, 69.50%; H, 7.88%; N, 18.40.

EXAMPLE 27

Using a procedure analogous to that described in Example 2(a), the compound believed to be 5,6-dihydro-5-oxo-6-(γ-dimethylamino-n-propyl) - 8(or 9)-methyl-11H-pyrido[2,3-b][1,5]benzodiazepine, B.P.$_{0.05}$ 192–193° C., M.P. 98–100° C. (recrystallized from petroleum ether), was prepared from 5,6-dihydro-5-oxo-8(or 9)-methyl-11H-pyrido[2,3-b][1,5]benzodiazepine and γ-dimethylamino-n-propyl chloride.

Analysis.—$C_{18}H_{22}N_4O$; mol. wt. 310.4. Calculated: C, 69.65%; H, 7.15%; N, 18.05%. Found: C, 69.90%; H, 7.31%; N, 17.90%.

EXAMPLE 28

Using a procedure analogous to that described in Example 2(a), the compound believed to be 5,6-dihydro-5-oxo-6-(γ-[N'-methylpiperazino]-n-propyl)-8(or 9)-methyl-11H - pyrido[2,3-b][1,5]benzodiazepine, B.P.$_{0.04}$ 224–226° C., M.P. 118–119° C. (recrystallized from petroleum ether), was prepared from 5,6-dihydro-5-oxo-8(or 9)-methyl-11H-pyrido[2,3-b][1,5]benzodiazepine and γ-(N'-methylpiperazino)-n-propyl chloride.

Analysis.—$C_{21}H_{27}N_5O$; mol. wt. 365.5. Calculated C, 69.01%; H, 7.44%; N, 19.17%. Found: C, 69.20%; H, 7.75%; N, 19.30%.

EXAMPLE 29

Using a procedure analogous to that described in Example 2(a), 5,6 - dihydro-5-oxo-6-(p-methoxy-benzyl)-11H-pyrido[2,3-b][1,5]benzodiazepine, M.P. 193–195° C. (recrystallized from ethanol), of the formula

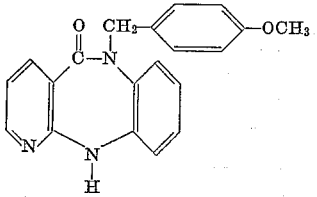

was prepared from 5,6-dihydro-5-oxo-11H-pyrido[2,3-b][1,5]benzodiazepine and p-methoxy-benzyl chloride.

15

*Analysis.*—$C_{20}H_{17}N_3O_2$; mol. wt. 331.4. Calculated: C, 72.49%; H, 5.17%; N, 12.68%. Found: C, 72.50%; H, 5.20%; N, 12.62%.

EXAMPLE 30

Using a procedure analogous to that described in Example 2(a), the compound believed to be 5,6-dihydro-5-oxo-6-benzyl-8(or 9)-methyl - 11H - pyrido[2,3-b][1,5] benzodiazepine, M.P. 135–136° C. (recrystallized from cyclohexane), was prepared from 5,6-dihydro-5-oxo-8(or 9)-methyl - 11H - pyrido[2,3-b][1,5]benzodiazepine and benzyl bromide.

*Analysis.*—$C_{20}H_{17}N_3O$; mol. wt. 315.4. Calculated: C, 76.17%; H, 5.43%; N, 13.33%. Found: C, 76.35%; H, 5.59%; N, 13.43%.

EXAMPLE 31

Using a procedure analogous to that described in Example 2(a), the compound believed to be 5,6-dihydro-5-oxo-6-(p-chlorobenzyl)-8(or 9)-methyl-11H-pyrido[2,3-b][1,5]benzodiazepine, M.P. 174–176° C. (recrystallized from ethanol), was prepared from 5,6-dihydro-5-oxo-8(or 9)-methyl-11H-pyrido[2,3-b][1,5]benzodiazepine and p-chlorobenzyl chloride.

*Analysis.*—$C_{20}H_{16}ClN_3O$; mol. wt. 349.9. Calculated: C, 68.67%; H, 4.61%; N, 12.02%; Cl, 10.13%. Found: C, 68.60%; H, 4.87%; N, 12.45%; Cl, 10.03%.

EXAMPLE 32

Using a procedure analogous to that described in Example 2(a), 5,6 - dihydro-5-oxo-6-($\beta$-piperidino-ethyl)-11H - pyrido[2,3-b][1,5]benzodiazepine, B.P.$_{0.05}$ 193–196° C., was prepared from 5,6-dihydro - 5 - oxo - 11H-pyrido[2,3-b][1,5]benzodiazepine and $\beta$-piperidino-ethyl chloride.

*Analysis.*—$C_{19}H_{22}N_4O$; mol. wt. 322.4. Calculated: C, 70.86%; H, 6.89%; N, 17.40%. Found: C, 70.90%; H, 6.91%; N, 17.66%.

EXAMPLE 33

Using a procedure analogous to that described in Example 2(a), the compound believed to be 5,6-dihydro-5-oxo-6-methyl-8(or 9)-chloro - 11H - pyrido[2,3-b][1,5] benzodiazepine, M.P. 184–186° C. (recrystallized from ethanol), was prepared from 5,6-dihydro-5-oxo-8(or 9)-chloro-11H-pyrido[2,3-b][1,5]benzodiazepine and methyl iodide.

*Analysis.*—$C_{13}H_{10}ClN_3O$; mol. wt. 259.7. Calculated: C, 60.12%; H, 3.88%; N, 16.19%; Cl, 13.65%. Found: C, 60.35%; H, 4.01%; N, 16.17%; Cl, 13.58%.

EXAMPLE 34

Using a procedure analogous to that described in Example 2(a), the compound believed to be 5,6-dihydro-5-oxo-6-ethyl-8(or 9)-methyl - 11H-pyrido[2,3-b][1,5]benzodiazepine, M.P. 119–122° C. (recrystallized from acetonitrile), was prepared from 5,6-dihydro-5-oxo-8(or 9)-methyl-11H-pyrido[2,3-b][1,5]benzodiazepine and ethyl iodide.

*Analysis.*—$C_{15}H_{15}N_3O$; mol. wt. 253.3. Calculated: C, 71.13%; H, 5.97%; N, 16.59%. Found: C, 71.10%; H, 5.99%; N, 16.78%.

EXAMPLE 35

Using a procedure analogous to that described in Example 2(a), the compound believed to be 5,6-dihydro-5-oxo-6-allyl-8(or 9)-methyl-11H-pyrido[2,3-b][1,5]benzodiazepine, M.P. 133–135° C. (recrystallized from petroleum ether), was prepared from 5,6-dihydro-5-oxo-8(or 9)-methyl - 11H - pyrido[2,3-b][1,5]benzodiazepine and allyl bromide.

*Analysis.*—$C_{16}H_{15}N_3O$; mol. wt. 265.3. Calculated: C, 72.43%; H, 5.70%; N, 15.84%. Found: C, 72.40%; H, 5.72%; N, 15.55%.

EXAMPLE 36

Using a procedure analogous to that described in Example 2(a), 5,6-dihydro-5-oxo-6-allyl-8,9-dimethyl-11H-pyrido[2,3-b][1,5]benzodiazepine, M.P. 148–149° C. (recrystallized from ethanol), was prepared from 5,6-dihydro-5-oxo-8,9-dimethyl-11H - pyrido[2,3-b][1,5]benzodiazepine and allyl bromide.

*Analysis.*—$C_{17}H_{17}N_3O$; mol. wt. 279.3. Calculated: C, 73.09%; H, 6.13%; N, 15.06%. Found: C, 72.80%; H, 6.08%; N, 15.02%.

EXAMPLE 37

Using a procedure analogous to that described in Example 2(a), the compound believed to be 5,6-dihydro-5-oxo-6-($\beta$-morpholino-ethyl)-8(or 9)-methyl-11H-pyrido[2,3-b][1,5]benzodiazepine, M.P. 147° C. (recrystallized from a mixture of ethylacetate and ether), was prepared from 5,6-dihydro-5-oxo-8(or 9)-methyl - 11H - pyrido[2,3-b][1,5]benzodiazepine and $\beta$-morpholino-ethyl chloride.

*Analysis.*—$C_{19}H_{22}N_4O_2$; mol. wt. 338.4. Calculated: C, 67.43%; H, 6.55%; N, 16.56%. Found: C, 67.50%; H, 6.51%; N, 16.90%.

EXAMPLE 38

Using a procedure analogous to that described in Example 2(a), the compound believed to be 5,6-dihydro-5-oxo - 6($\beta$-piperidino-ethyl)-8(or 9)-chloro-11H-pyrido[2,3-b][1,5]benzodiazepine, M.P. 170–171° C. (recrystallized from ethanol), was prepared from 5,6-dihydro-5-oxo - 8(or 9)-chloro-11H-pyrido[2,3-b][1,5]benzodiazepine and $\beta$-piperidino-ethyl chloride.

*Analysis.*—$C_{19}H_{21}ClN_4O$; mol. wt. 356.8. Calculated: C, 63.95%; H, 5.93%; N, 15.70%; Cl, 9.94%. Found: C, 63.65%; H, 5.99%; N, 15.82%; Cl, 10.08%.

EXAMPLE 39

Using a procedure analogous to that described in Example 2(a), the compound believed to be 5,6-dihydro-5-oxo-6-($\beta$-piperidino-ethyl)-8(or 9)-methyl-11H-pyrido[2,3-b][1,5]benzodiazepine, M.P. 156–157° C. (recrystallized from isopropanol), was prepared from 5,6-dihydro-5-oxo-8(or 9)-methyl-11H-pyrido[2,3-b][1,5]benzodiazepine and $\beta$-piperidino-ethyl chloride.

*Analysis.*—$C_{20}H_{24}N_4O$; mol. wt. 336.4. Calculated: C, 71.42%; H, 7.18%; N, 16.65%. Found: C, 71.20%; H, 7.28%; N, 16.90%.

EXAMPLE 40

Using a procedure analogous to that described in Example 2(a), 5,6-dihydro-5-oxo-6-(2'-methyl-allyl)-8,9-dimethyl-11H-pyrido[2,3-b][1,5]benzodiazepine, M.P. 197–200° C. (recrystallized from ethanol), of the formula

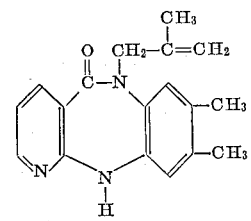

was prepared from 5,6-dihydro-5-oxo-8,9-dimethyl-11H-pyrido[2,3-b][1,5]benzodiazepine and 2-methylallyl chloride.

*Analysis.*—$C_{18}H_{19}N_3O$; mol wt. 293.4. Calculated: C, 73.70%; H, 6.52%; N, 14.33%. Found: C, 74.00%; H, 6.83%; N, 14.05%.

EXAMPLE 41

Using a procedure analogous to that described in Example 2(a), the compound believed to be 5,6-dihydro-5-oxo-6-allyl-8(or 9)-chloro-11H-pyrido[2,3-b][1,5]benzodiazepine, M.P. 167–169° C. (recrystallized from ethanol), was prepared from 5,6-dihydro-5-oxo-8(or 9)- chloro - 11H-pyrido[2,3-b][1,5]benzodiazepine and allyl bromide.

*Analysis.*—C₁₅H₁₂ClN₃O; mol. wt. 285.7. Calculated: C, 63.05%; H, 4.23%; N, 14.71%; Cl, 12.41%. Found: C, 63.10%; H, 4.15%; N, 14.67%; Cl, 12.35%.

EXAMPLE 42

Using a procedure analogous to that described in Example 1(b), 5,6 - dihydro-6-(β-piperidino-ethyl)-8,9-dimethyl - 11H-pyrido[2,3-b][1,5]benzodiazepine, B.P.$_{0.03}$ 187–190° C., of the formula

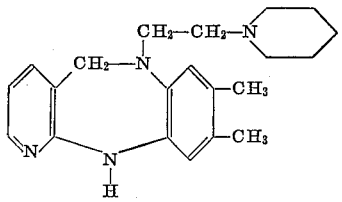

was prepared by reducing 5,6-dihydro-5-oxo-6-(β-piperidinoethyl) - 8,9 - dimethyl-11H-pyrido[2,3-b][1,5]benzodiazepine with lithium aluminum hydride.

*Analysis.*—C₂₁H₂₈N₄; mol. wt. 336.5. Calculated: C, 74,96.%; H, 8.39%; N, 16.65%. Found: C, 74.50%; H, 8.48%; N, 16.85%.

EXAMPLE 43

Using a procedure analogous to that described in Example 1(b), the compound believed to be 5,6-dihydro-6-(γ - [N' - methylpiperazino]-n-propyl)-8(or 9) - chloro-11H-pyrido[2,3-b][1,5]benzodiazepine, B.P.$_{0.025}$ 210–212° C., was prepared by reducing 5,6-dihydro-5-oxo-6-(γ - [N' - methylpiperazino]-n-propyl)-8(or 9) - chloro-11H-pyrido[2,3-b][1,5]benzodiazepine with lithium aluminum hydride.

*Analysis.*—C₁₉H₂₆N₄; mol. wt. 310.4. Calculated: C, 64.59%; H, 7.05%; N, 18.83%; Cl, 9.53%. Found: C, 64.50%; H, 7.25%; N, 19.10%; Cl, 9.70%.

EXAMPLE 44

Using a procedure analogous to that described in Example 1(b), the compound believed to be 5,6-dihydro-6-(γ-[N'-methylpiperazino] - n - propyl)-8(or 9)-methyl-11H-pyrido[2,3-b][1,5-benzodiazepine, B.P.$_{0.05}$ 197° C., was prepared by reducing 5,6-dihydro-5-oxo-6-(γ-[N'-methylpiperazino]-n-propyl)-8(or 9)-methyl-11H-pyrido[2,3-b][1,5]benzodiazepine with lithium aluminum hydride.

*Analysis.*—C₂₁H₂₉N₅; mol. wt. 351.5 Calculated: C, 71.76%; H, 8.31%; N, 19.93%. Found: C, 71.85%; H, 8.54%; N, 20.12%.

EXAMPLE 45

Using a procedure analogous to that described in Example 1(b), 5,6-dihydro-6-(γ-dimethylamino-n-propyl)-8,9 - dimethyl - 11H - pyrido[2,3-b][1,5]benzodiazepine, B.P.$_{0.07}$ 196–197° C., was prepared by reducing 5,6-dihydro-5-oxo-6-(γ-dimethylamino - n - propyl)-8,9-dimethyl-11H-pyrido[2,3-b][1,5]benzodiazepine with lithium aluminum hydride.

*Analysis.*—C₁₉H₂₆N₄; mol. wt. 310.4. Calculated: C, 73.51%; H, 8.44%; N, 18.05%. Found: C, 73.50%; H, 8.54%; N, 18.30%.

EXAMPLE 46

Using a procedure analogous to that described in Example 1(b), 5,6-dihydro-6-(γ-[N'-methylpiperazino]-n-propyl) - 8,9-dimethyl-11H - pyrido[2,3-b][1,5]benzodiazepine, B.P.$_{0.03}$ 203–206° C., was prepared by reducing 5,6-dihydro-5-oxo-6-(γ-[N'-methylpiperazino] - n - propyl) - 8,9 - dimethyl-11H-pyrido[2,3-b][1,5]benzodiazepine with lithium aluminum hydride.

*Analysis.*—C₂₂H₃₁N₅; mol. wt. 365.5. Calculated: C, 72.29%; H, 8.55%; N, 19.16%. Found: C, 72.20%; H, 8.85%; N, 19.25%.

EXAMPLE 47

Using a procedure analogous to that described in Example 1(b), the compound believed to be 5,6-dihydro-6 - methyl-8(or 9)-chloro-11H-pyrido[2,3-b][1,5]benzodiazepine, M.P. 140–142° C. (recrystallized from cyclohexane), was prepared by reducing 5,6-dihydro-5-oxo-6-methyl - 8(or 9) - chloro-11H-pyrido[2,3-b][1,5]benzodiazepine with lithium aluminum hydride.

*Analysis.*— C₁₃H₁₂ClN₃; mol. wt. 245.7. Calculated: C, 63.54%; H, 4.92%; N, 17.11%; Cl, 14.43%. Found: C, 63.30%; H, 4.96%; N, 16.90%; Cl, 14.36%.

EXAMPLE 48

Using a procedure analogous to that described in Example 1(b), the compound believed to be 5,6-dihydro-6 - ethyl - 8(or 9) -methyl-11H-pyrido[2,3-b][1,5]benzodiazepine, B.P.$_{0.03}$ 136° C., was prepared by reducing 5,6 - dihydro - 5-oxo-6-ethyl-8(or 9)-methyl-11H-pyrido[2,3-b][1,5]benzodiazepine with lithium aluminum hydride.

*Analysis.*—C₁₅H₁₇N₃; mol. wt. 239.7. Calculated: C, 75.28%; H, 7.16%; N, 17.56%. Found C, 75.05%; H, 7.20%; N, 17.80%.

EXAMPLE 49

Using a procedure analogous to that described in Example 1(b), the compound believed to be 5,6-dihydro-6-benzyl-8(or 9) - methyl-11H-pyrido[2,3-b][1,5]benzodiazepine, M.P. 138–140° C. (recrystallized from cyclohexane), was prepared by reducing 5,6-dihydro-5-oxo-6-benzyl - 8(or 9)-methyl-11H-pyrido[2,3-b][1,5]benzodiazepine with lithium aluminum hydride.

*Analysis.*—C₂₀H₁₉N₃; mol. wt. 301.4. Calculated: C, 79.70%; H, 6.35%; N, 13.95%. Found: C, 79.70%; H, 6.43%; N, 13.65%.

EXAMPLE 50

Using a procedure analogous to that described in Example 1(b), the compound believed to be 5,6-dihydro-6 - (p-chloro-benzyl)-8(or 9)-methyl-11H-pyrido[2,3-b][1,5]benzodiazepine, M.P. 120–121° C. (recrystallized from ethanol) was prepared by reducing 5,6-dihydro-5-oxo - 6 - (p - chloro-benzyl)-8(or 9)-methyl-11H-pyrido[2,3-b][1,5]benzodiazepine with lithium aluminum hydride.

*Analysis.*—C₂₀H₁₈ClN₃; mol. wt. 335.8. Calculated: C, 71.53%; H, 5.40%; N, 12.51%; Cl, 10.56%. Found: C, 71.60%; H, 5.52%; N, 12.55%; Cl, 10.43%.

EXAMPLE 51

Using a procedure analogous to that described in Example 1(b), the compound believed to be 5,6-dihydro-6-(β-morpholino-ethyl)-8(or 9) - methyl - 11H - pyrido[2,3-b][1,5-]benzodiazepine, B.P.$_{0.02}$ 200–202° C., was prepared by reducing 5,6-dihydro-5-oxo-6-(β-morpholinoethyl)-8(or 9)-methyl-11H - pyrido[2,3-b][1,5]benzodiazepine with lithium aluminum hydride.

*Analysis.*—C₁₉H₂₄N₄O; mol. wt. 324.4. Calculated: C, 70.34%; H, 7.46%; N, 17.27%. Found: C, 70.10%; H, 7.74%; N, 17.64%.

EXAMPLE 52

Using a procedure analogous to that described in Example 1(b), the compound believed to be 5,6-dihydro-6-(β-piperidino-ethyl) - 8(or 9) - methyl-11H-pyrido[2,3-b][1,5]benzodiazepine, B.P.$_{0.03}$ 194–195° C., was prepared by reducing 5,6-dihydro-5-oxo-6(β-piperidino-ethyl)-8(or 9)-methyl-11H-pyrido[2,3-b][1,5]benzodiazepine with lithium aluminum hydride.

*Analysis.*—C₂₀H₂₆N₄; mol. wt. 322.5. Calculated: C, 74.50%; H, 8.13%; N, 17.37%. Found: C, 74.10%; H, 8.15%; N, 17.80%.

EXAMPLE 53

Using a procedure analogous to that described in Example 1(b), the compound believed to be 5,6-dihydro-6-($\beta$-dimethylamino-ethyl)-8(or 9)-methyl-11H-pyrido[2,3-b][1,5]benzodiazepine, B.P.$_{0.03}$ 167–170° C., was prepared by reducing 5,6-dihydro-5-oxo-6-($\beta$-dimethylamino-ethyl)-8(or 9)-methyl - 11H - pyrido[2,3 - b][1,5]benzodiazepine with lithium aluminum hydride.

*Analysis.*—$C_{17}H_{22}N_4$; mol. wt. 282.4. Calculated: C, 72.30%; H, 7.85%; N, 19.85%. Found: C, 72.15%; H, 7.66%; N, 19.82%.

EXAMPLE 54

Using a procedure analogous to that described in Example 1(b), the compound believed to be 5,6-dihydro-6-($\gamma$-dimethylamino-n-propyl)-8(or 9)-chloro-11H-pyrido[2,3-b][1,5]benzodiazepine, B.P.$_{0.04}$ 174–176° C., was prepared by reducing 5,6-dihydro-5-oxo-6-($\gamma$-dimethylamino-n-propyl)-8(or 9)-chloro-11H-pyrido[2,3-b][1,5]benzodiazepine with lithium aluminum hydride.

*Analysis.*—$C_{17}H_{21}ClN_4$; mol. wt. 316.8. Calculated: C, 64.44%; H, 6.68%; N, 17.69%; Cl, 11.19%. Found: C, 64.20%; H, 6.62%; N, 17.85%; Cl 11.08%.

EXAMPLE 55

Using a procedure analogous to that described in Example 1(b), the compound believed to be 5,6-dihydro-6-($\beta$-piperidino-ethyl)-8(or 9)-chloro-11H-pyrido[2,3-b][1,5]benzodiazepine, B.P.$_{0.015}$ 190° C., was prepared by reducing 5,6-dihydro-5-oxo-6-($\beta$-piperidino-ethyl)-8(or 9)-chloro-11H-pyrido[2,3-b][1,5]benzodiazepine with lithium aluminum hydride.

*Analysis.*—$C_{19}H_{23}ClN_4$; mol. wt. 342.9. Calculated: C, 66.56%; H, 6.76%; N, 16.34%; Cl 10.34%. Found: C, 66.90%; H, 6.89%; N, 16.45%; Cl 10.33%.

EXAMPLE 56

Using a procedure analogous to that described in Example 7(b), 5,6-dihydro-6-($\beta$-piperidino-ethyl)-11H-pyrido[2,3-b][1,5]benzodiazepine, B.P.$_{0.04}$ 174° C., was prepared from 5,6-dihydro-11H-pyrido[2,3-b][1,5]benzodiazepine and $\beta$-piperidino-ethyl chloride.

*Analysis.*—$C_{19}H_{24}N_4$; mol. wt. 308.5. Calculated: C, 73.99%; H, 7.84%; N, 18.17%. Found: C, 73.70%; H, 7.96%; N, 18.30%.

EXAMPLE 57

Using a procedure analogous to that described in Example 7(b), 5,6-dihydro-6-($\gamma$-[N'-methylpiperazino]-n-propyl) - 11H - pyrido[2,3-b][1,5]benzodiazepine, B.P.$_{0.03}$ 185–190° C., was prepared from 5,6-dihydro-11H-pyrido[2,3-b][1,5]benzodiazepine and $\gamma$-(N'-methylpiperazino)-n-propyl chloride.

*Analysis.*—$C_{20}H_{27}N_5$; mol. wt. 337.5. Calculated: C, 71.18%; H, 8.06%; N, 20.76%. Found: C, 70.65%; H, 8.17%; N, 20.95%.

EXAMPLE 58

Using a procedure analogous to that described in Example 7(b), 5,6 - dihydro-6-allyl-11H-pyrido[2,3-b][1,5]benzodiazepine was prepared from 5,6-dihydro-11H-pyrido[2,3-b][1,5]benzodiazepine and allyl bromide. Its hydrobromide, prepared by recrystallizing the free base from an ethanolic solution of hydrogen bromide, had a melting point of 184–185 C.

*Analysis.*—$C_{15}H_{16}BrN_3$; mol. wt. 318.2. Calculated: C, 56.62%; H, 5.07%; N, 13.20%; Br, 25.11%. Found: C, 56.70%; H, 5.15%; N, 13.12%; Br 25.25%.

EXAMPLE 59

Using a procedure analogous to that described in Example 7(b), the compound believed to be 5,6-dihydro-6-allyl-8(or 9)-methyl-11H - pyrido[2,3 - b][1,5]benzodiazepine, B.P.$_{0.07}$ 150–152° C., was prepared from 5,6-dihydro-8(or 9)-methyl-11H-pyrido[2,3-b][1,5]benzodiazepine and allyl bromide.

*Analysis.*—$C_{16}H_{17}N_3$; mol. wt. 251.3. Calculated: C, 76.46%; H, 6.82%; N, 16.72%. Found: C, 76.20%; H, 6.95%; N, 17.00%.

EXAMPLE 60

Using a procedure analogous to that described in Example 7(b), 5,6-dihydro-6-allyl-8,9-dimethyl-11H-pyrido[2,3-b][1,5]benzodiazepine, B.P.$_{0.005}$ 147–148° C., was prepared from 5,6-dihydro-8,9-dimethyl-11H-pyrido[2,3-b][1,5]benzodiazepine and allyl bromide.

*Analysis.*—$C_{17}H_{19}N_3$; mol. wt. 265.4. Calculated: C, 76.94%; H, 7.22%; N, 15.84%. Found: C, 77.10%; H, 7.43%; N, 15.76%.

The compounds according to the present invention, that is, those embraced by Formula I above and their non-toxic, pharmacologically acceptable acid addition salts, have useful pharmacodynamic properties. More particularly, they exhibit antipyretic, analgesic, sedative, and antiphlogistic activities in warm-blooded animals.

For therapeutic purposes, the compounds of the present invention are administered to warm-blooded animals by the oral or parenteral route as active ingredients in customary dosage unit compositions, that is, compositions in dosage unit form consisting essentially of an inert pharmaceutical carrier and one dosage unit of the active ingredient, such as tablets, coated pills, suspensions, solutions, suppositories, gelatin capsules and the like. One dosage unit of the compounds according to the present invention is from 50 to 400 mgm., preferably 100 mgm.

The following examples illustrate a few dosage unit compositions comprising a compound of the present invention as an active ingredient. The parts are parts by weight.

EXAMPLE 61

*Tablets.*—The tablet composition is compounded from the following ingredients:

| | Parts |
|---|---|
| 5,6-dihydro-5-oxo-6-allyl-11H-pyrido[2,3-b][1,5]benzodiazepine | 100.0 |
| Secondary calcium phosphate | 93.0 |
| Potato starch | 50.0 |
| Gelatin | 5.0 |
| Magnesium stearate | 2.0 |
| Total | 250.0 |

Compounding procedure:

The pyridobenzodiazepine compound, the calcium phosphate and one-half of the required amount of potato starch are admixed with each other, the mixture is moistened with an aqueous 10% solution of the gelatin, and the moist mass is forced through a 1.5 mm.-mesh screen. The granulate obtained thereby is dried at 45° C., again passed through the screen, and then admixed with the remaining potato starch and the magnesium stearate. The resulting mixture is pressed into 250 mgm.-tablets, each of which contains 100 mgm. of the active ingredient.

EXAMPLE 62

*Coated pills.*—The tablets obtained in Example 61 are coated with a thin shell consisting essentially of talcum and sugar, and the coating is polished with beeswax. Each pill weighs about 400 mgm. and also contains 100 mgm. of the active ingredient.

EXAMPLE 63

*Suppositories.*—The suppository composition is compounded from the following ingredients:

| | Parts |
|---|---|
| 5,6-dihydro-5-oxo-6-allyl-11H-pyrido[2,3-b][1,5]benzodiazepine | 100.0 |
| Cocoa butter | 1600.0 |
| Total | 1700.0 |

Compounding procedure:

The cocoa butter is melted at 45° C., the finely pulverized pyridobenzodiazepine compound is stirred into the molten mass, the mixture is homogenized, cooled to about 35° C., and poured into cooled suppository molds, each holding 1700 mgm. of the composition. Each suppository contains 100 mgm. of the active ingredient.

Dosage unit compositions comprising a compound of the present invention as an active ingredient may also contain one or more other active ingredients, such as a sedative, analgesic and the like, to complement the action of the pyridobenzodiazepine component, as illustrated by the following example:

EXAMPLE 64

*Tablets.*—The tablet composition is compounded from the following ingredients:

|  | Parts |
|---|---|
| 5,6-dihydro-5-oxo-6-allyl-11H-pyrido[2,3-b][1,5]benzodiazepine | 100.0 |
| 5-ethyl-5-phenyl-barbituric acid | 25.0 |
| Lactose | 60.0 |
| Potato starch | 25.0 |
| Polyvinylpyrrolidone | 6.0 |
| Colloidal silicic acid | 2.0 |
| Magnesium stearate | 2.0 |
| Total | 220.0 |

Compounding procedure:

The pyridobenzodiazepine compound, the barbituric acid compound, the lactose and the potato starch are intimately admixed with each other, the mixture is moistened with an aqueous 12.5% solution of the polyvinylpyrrolidone, and the moist mass is forced through a 1.5 mm.-mesh screen. The granulate obtained thereby is dried at 40° C., again passed through the screen, and admixed with the silicic acid and the magnesium stearate. The resulting mixture is pressed into 220 mgm.-tablets, each of which contains 100 mgm. of the pyridobenzodiazepine compound and 25 mgm. of the barbituric acid compound.

EXAMPLE 65

*Coated pills.*—The pill core composition is compounded from the following ingredients:

|  | Parts |
|---|---|
| 5,6-dihydro-5-oxo-6-allyl-11H-pyrido[2,3-b][1,5]benzodiazepine | 100.0 |
| 5-ethyl-5-phenyl-barbituric acid | 20.0 |
| Codeine phosphate | 10.0 |
| Lactose | 38.0 |
| Corn starch | 40.0 |
| Soluble starch | 10.0 |
| Magnesium stearate | 2.0 |
| Total | 220.0 |

Compounding procedure:

The pyridobenzodiazepine compound, the barbituric acid compound, the codeine phosphate, the lactose and one-half of the required amount of the corn starch are intimately admixed with each other, the mixture is moistened with an aqueous 20% solution of the soluble starch, and the moist mass is forced through a 1.5 mm.-mesh screen. The granulate thus obtained is dried at 40° C., again passed through the screen, and admixed with the remaining amount of the corn starch as well as with the magnesium stearate. The resulting mixture is pressed into 220 mgm.-pill cores, which are then coated with a thin shell consisting essentially of talcum and sugar, and the finished pills are polished with beeswax. Each coated pill weighs about 350 mgm. and contains 100 mgm. of the pyridobenzodiazepine compound, 20 mgm. of the barbituric acid compound and 10 mgm. of codeine phosphate.

Although the above dosage unit composition examples illustrate only one of the compounds according to the present invention as an active ingredient, it should be understood that any of the other compounds embraced by Formula I or non-toxic, pharmacologically acceptable acid addition salts thereof may be substituted for the particular pyridobenzodiazepine compound in Examples 61 through 65. Moreover, the amount of the pyridobenzodiazepine compound in these examples may be varied within the dosage unit limits set forth above, as may the amounts and nature of the inert ingredients.

While the present invention has been illustrated with the aid of certain specific embodiments thereof, it will be readily apparent to others skilled in the art that the invention is not limited to these embodiments and that various changes and modifications may be made without departing from the spirit of the invention or the scope of the appended claims.

I claim:

1. A compound selected from the group consisting of 5,6-dihydro-11H-pyrido[2,3-b][1,5]benzodiazepine derivatives of the formula

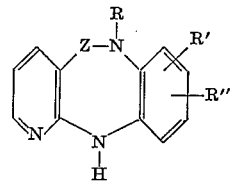

wherein
R is selected from the group consisting of lower alkenyl, benzyl, halobenzyl, lower alkoxy-benzyl and —A—B where A is lower alkylene and B is selected from the group consisting of hydrogen, halogen and lower alkoxy
R' and R" are each selected from the group consisting of hydrogen, lower alkyl and halogen, and
Z is selected from the group consisting of carbonyl and methylene,
and their non-toxic, pharmologically acceptable acid addition salts.

2. A compound selected from the group consisting of 5,6-dihydro-11H-pyrido[2,3-b][1,5]benzodiazepine derivatives of the formula

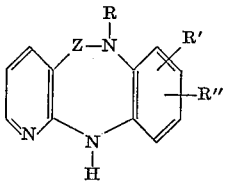

wherein
R is selected from the group consisting of allyl, isobutenyl, benzyl, chlorobenzyl, methoxy-benzyl and —A—B
where A is alkylene of 1 to 4 carbon atoms and B is selected from the group consisting of hydrogen, chlorine and methoxy
R' and R" are each selected from the group consisting of hydrogen, methyl and chlorine, and
Z is selected from the group consisting of carbonyl and methylene,
and their non-toxic, pharmacologically acceptable acid addition salts.

3. A compound selected from the group consisting of 5,6-dihydro-5-oxo-11H-pyrido[2,3-b][1,5]benzodiazepine derivatives of the formula

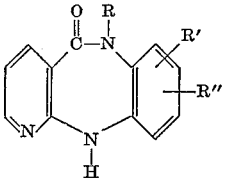

wherein
R is selected from the group consisting of allyl, isobutenyl, benzyl, chlorobenzyl, methoxy-benzyl and
—A—B
where A is alkylene of 1 to 4 carbon atoms and
B is selected from the group consisting of hydrogen, chlorine and methoxy
R' and R" are each selected from the group consisting of hydrogen, methyl and chlorine, and
and their non-toxic, pharmacologically acceptable acid addition salts.

4. A compound selected from the group consisting of 5,6-dihydro-11H-pyrido[2,3-b][1,5]benzodiazepine derivatives of the formula

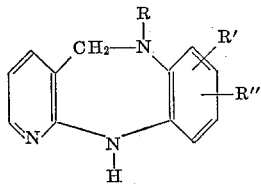

wherein
R is selected from the group consisting of allyl, isobutenyl, benzyl, chlorobenzyl, methoxy-benzyl and
—A—B
where A is alkylene of 1 to 4 carbon atoms and
B is selected from the group consisting of hydrogen, chlorine and methoxy
R' and R" are each selected from the group consisting of hydrogen, methyl and chlorine, and
and their non-toxic, pharmacologically acceptable acid addition salts.

5. 5,6 - dihydro-5-oxo-6-allyl-11H-pyrido[2,3-b][1-5]benzodiazepine.
6. 5,6-dihydro-5-oxo-6-methyl-11H-pyrido[2,3-b][1,5]benzodiazepine.
7. 5,6 - dihydro-5-oxo-6-ethyl-11H-pyrido[2,3-b][1,5]benzodiazepine.

References Cited

UNITED STATES PATENTS 3,038,896   6/1962   Habicht et al. _____ 260—239
3,150,125   9/1964   Schmutz et al. _____ 260—239.3

FOREIGN PATENTS 658,624   2/1963   Canada.

ALEX MAZEL, *Primary Examiner.*
ALTON D. ROLLINS, *Examiner.*